United States Patent
Botting et al.

(10) Patent No.: US 10,087,871 B2
(45) Date of Patent: Oct. 2, 2018

(54) ADD-ON FUEL INJECTOR CONTROL SYSTEM AND METHOD

(71) Applicant: Total Fuel Systems, LLC, Las Vegas, NV (US)

(72) Inventors: Richard W. Botting, Las Vegas, NV (US); David James Bucciarelli, Yucca, AZ (US)

( * ) Notice: Subject to any disclaimer, the term of this patent is extended or adjusted under 35 U.S.C. 154(b) by 0 days.

(21) Appl. No.: 15/390,516

(22) Filed: Dec. 25, 2016

(65) Prior Publication Data
US 2018/0179982 A1   Jun. 28, 2018

(51) Int. Cl.
| F02D 41/30 | (2006.01) |
| F02M 51/00 | (2006.01) |
| F02M 63/00 | (2006.01) |
| F02D 41/26 | (2006.01) |
| F02D 41/20 | (2006.01) |
| F02D 41/14 | (2006.01) |
| F02D 41/10 | (2006.01) |

(52) U.S. Cl.
CPC ............ *F02D 41/30* (2013.01); *F02D 41/10* (2013.01); *F02D 41/1497* (2013.01); *F02D 41/20* (2013.01); *F02D 41/26* (2013.01); *F02M 51/005* (2013.01); *F02M 63/0015* (2013.01); *F02D 2200/101* (2013.01); *F02D 2400/11* (2013.01)

(58) Field of Classification Search
CPC .... F02D 2400/11; F02D 41/045; F02D 41/10; F02D 41/40; F02D 41/30; F02D 41/3005; F02D 41/34
USPC .......... 123/478–480, 488, 490, 492; 701/104
See application file for complete search history.

(56) References Cited

U.S. PATENT DOCUMENTS

| 3,964,443 | A | 6/1976 | Hartford |
| 4,771,848 | A | 9/1988 | Namba et al. |
| 4,883,035 | A | 11/1989 | Shimomura et al. |
| 5,088,464 | A | 2/1992 | Meaney |
| 5,657,625 | A | 8/1997 | Koga et al. |
| 6,151,547 | A | 11/2000 | Kumar et al. |
| 6,453,874 | B1 | 9/2002 | Duffy et al. |
| 6,681,752 | B1 | 1/2004 | Kreikemeier et al. |
| 6,725,148 | B1 * | 4/2004 | Stewart .................. F02B 75/20 123/480 |
| 6,836,721 | B2 | 12/2004 | Stevens |
| 6,850,835 | B1 * | 2/2005 | Barnes ................ F02D 41/0087 123/299 |
| 7,003,393 | B2 | 2/2006 | Stevens |

(Continued)

*Primary Examiner* — Erick Solis
*Assistant Examiner* — Robert Werner
(74) *Attorney, Agent, or Firm* — Connie R. Masters

(57) ABSTRACT

An add-on fuel injector control system and method for modifying a fuel injector pulse width for an electronically-controlled internal combustion engine is provided, which intercepts a pulse from an engine control unit (ECU) to a fuel injector, determines the optimal operational band, and either sends a modified or unmodified control signal pulse width to the fuel injector, depending on the band determination. The pulse width is increased by a total fuel adder. If the ECU control signal is determined to be in the auto-tune band, the controller modifies the output pulse width based on a comparison of current and previous values correlated to the rate of change of acceleration and whether the previous total fuel adder included an addition or subtraction of an auto-tune adder.

19 Claims, 6 Drawing Sheets

(56) References Cited

U.S. PATENT DOCUMENTS

| | | | | |
|---|---|---|---|---|
| 7,031,823 | B2* | 4/2006 | Chatfield | F02D 11/105 |
| | | | | 123/486 |
| 7,124,852 | B2 | 10/2006 | Hasegawa | |
| 7,404,397 | B2* | 7/2008 | Dobeck | F02D 19/066 |
| | | | | 123/1 A |
| 7,527,040 | B2* | 5/2009 | Couch | F02D 41/20 |
| | | | | 123/490 |
| 7,798,128 | B2 | 9/2010 | Bellistri et al. | |
| 7,805,236 | B2* | 9/2010 | Mullen | F02D 41/1454 |
| | | | | 123/694 |
| 7,826,957 | B2 | 11/2010 | Fabien | |
| 8,161,946 | B2 | 4/2012 | Pursifull | |
| 8,267,064 | B2 | 9/2012 | Martin et al. | |
| 8,688,351 | B2 | 4/2014 | Oalen et al. | |
| 8,706,383 | B2* | 4/2014 | Sauve | F02D 41/0025 |
| | | | | 123/434 |
| 8,868,312 | B2 | 10/2014 | Pedlar et al. | |
| 8,996,279 | B2* | 3/2015 | Dobeck | F02D 41/266 |
| | | | | 701/103 |
| 2011/0088461 | A1 | 4/2011 | Howarth et al. | |

\* cited by examiner

FIG. 3

| Band | Total Adder 55 | | | | Output Pulse 40 |
|---|---|---|---|---|---|
| Pass-through 60 | | | | | ECU Pulse Width 25 |
| Cruise 70 | 75 | | | | 25 + 55 |
| Acceleration 80 | 75 | + | 85 | | 25 + 55 |
| Auto-tune 90 | 75 | + | (85) | +/- 95 | 25 + 55 |

R2>R1 = Faster change of rate of acceleration
R2<R1 = Slower change of rate of acceleration

ADD-ON FUEL INJECTOR CONTROL SYSTEM AND METHOD

FIELD OF INVENTION

This invention relates generally to internal combustion engines, and, more particularly, relates to an add-on electronic fuel injector control system and method for improving engine performance by managing a fuel injection pulse width intercepted from the stock electronic control unit (ECU).

BACKGROUND OF THE INVENTION

Modern internal combustion engines typically have one or more combustion chambers with a piston movably mounted in, or mounted relative to, the combustion chamber. The piston is connected to an output device, such as a crankshaft. An air intake system provides air to each combustion chamber. A fuel system delivers fuel from a fuel supply through delivery lines to one or more fuel injectors. The fuel is mixed with air, and, after the piston compresses the fuel-air mixture, the fuel is ignited, causing combustion. The expansion of the combustion gases pushes the piston during the power stroke and causes movement of the output device.

A stock electronic control unit (ECU) includes a microprocessor that processes inputs and adjusts the air-fuel ratio by outputting a fuel injector control signal. The ECU typically monitors several key elements that are fundamental to combustion engines, for example, exhaust gas temperature, exhaust oxygen levels, throttle position, rpm's, torque, power requirements, engine temperature, manifold absolute pressure (MAP), outside air temperature and humidity, as well as other factors.

Generally, the stock ECU adjusts the timing of the engine fuel requirements based on a precise set of numbers loaded into look-up tables or maps within the ECU that have been pre-computed by the manufacturer for that particular vehicle. These are pre-computed based on stoichiometric or theoretical combustion in which the stoichiometric ratio of air to gasoline (air-fuel ratio) at the time of ignition is 14.7 to 1. The stock ECU outputs ECU pulses, each having particular characteristics, such as the fuel injector pulse width (the length of time the fuel injector remains open), the timing of the leading edge of each pulse, and the distance or interval between equivalent parts of adjacent pulses. The disadvantage of the use of a look-up table is that the pre-computed values are only optimal for an ideal, new engine. Particularly if significant aftermarket modifications (for example, adding or changing a turbocharger, adding or changing an intercooler, changing of the exhaust system, and modifying the intake system) are made to the vehicle's engine system, the pre-computed values will not provide optimum engine functionality or performance. To address the need to modify the stock ECU fuel delivery system, several add-on, aftermarket or secondary ECU's have been developed.

One such secondary ECU is disclosed in U.S. Pat. No. 8,996,279 issued to Dobeck. In this system, an attempt was made to optimize fuel delivery, but the method is only applicable during an open-loop power mode. The system uses two factors, the engine speed and whether the previous duration of the fuel injector control signal from the vehicle's ECU had time added to it or subtracted from it. Whether time is added to or subtracted from the current ECU duration is determined by (1.) whether the duration of the previous engine cycle was increased (had time added to the stock duration, so more fuel was given) or decreased (had time subtracted from the stock duration, so less fuel was given) and (2.) whether the engine speed increased or decreased. Though the Dobeck system may perform well at times, at other times it does not improve engine performance. For example, the Dobeck system continues to increase each duration output if the speed is increasing and if the immediately preceding duration had been increased, even though a point will be reached at which this system is reducing the performance. Additionally, the stock duration is typically on the lean side, and, the Dobeck system intermittently reduces this stock duration. The reduction below the stock duration often has an adverse effect on the engine performance.

Overall, the Dobeck system does not operate efficiently because the increase and decrease of speed does not correspond to the need for fuel in all situations. For example, in some situations, though the speed of the vehicle is increasing, the vehicle's fueling requirements may become less. In such situations, and regardless how slightly the vehicle's speed is increasing, the Dobeck system increases the amount of fuel given. If a vehicle engine speeds up while the vehicle goes downhill and if the duration had been increased, the Dobeck system again gives more fuel, even though the vehicle does not need more fuel. In other situations, if the speed of the engine is decreasing (no matter for what reason), the Dobeck system decreases the amount of fuel provided by the fuel injectors even when more fuel is needed for optimum performance. For example, when a vehicle is going up a very steep hill, the fuel requirements increase dramatically, even if the engine's speed may reduce due to lack of power. In this instance, the Dobeck system determines that the speed has decreased, so if the last duration was increased over the stock duration, the new duration time is decreased, even though the engine would perform better with more fuel.

The prior art add-on control systems are, at best, partial solutions. The prior art systems experience one or more of the following problems: all the sets of conditions experienced by an internal combustion engine are not addressed; performance is improved only at times; smooth transitions are not provided; and the already lean stock pulse width duration is decreased at times.

Accordingly, there is a need for a system that increases engine performance in more situations and in additional sets of conditions, provides smooth transitions between operational modes, and does not reduce the pulse width below the stock pulse width.

BRIEF SUMMARY OF THE INVENTION

The present invention is directed to an add-on electronic fuel injector control system and method that manages and/or adjusts an ECU's fuel injector pulse width to improve engine performance. The add-on electronic fuel injector control system intercepts a control signal sent from an engine control unit (ECU) to a fuel injector and utilizes a controller to determine the operating mode or band into which the engine characteristics fall. Then the control system either enables transmission of an unmodified pulse or a modified (increased) output pulse to the fuel injector, depending upon the determination the controller has made as to which operating band will provide optimum engine performance. Four operating bands are provided, which are the pass-through band, the cruise band, the acceleration band, and the hunt or auto-tune band. A smooth, seamless transition is provided between the bands, thus eliminating erratic engine behavior, because each band builds on the fuel adder output of the previous band.

In one aspect, initially, upon startup, the add-on control system operates in the pass-through band until a set of parameters or thresholds are met. In this band, it passes the ECU control signal pulse from the stock ECU unmodified through to the fuel injectors. After the thresholds are met, the control system enters the cruise band in which the controller adds time to the received ECU pulse width (generated by the ECU to control the fuel injector), with the added time preferably based on a percentage of the ECU pulse width. The value of this pulse width increase is the cruise fuel adder, which in this band is equal to a total fuel adder.

In another aspect, if the received ECU pulse width increases above an acceleration pulse-width transition point 64, the received ECU pulse width is further increased by an acceleration fuel adder, which is added to the cruise fuel adder. Thus, in the acceleration band, the total fuel adder is the cruise fuel adder plus the acceleration fuel adder, and the ECU pulse width is increased by the time value of the total fuel adder.

In another aspect, if the received ECU pulse width increases further—above the auto-tune pulse width transition point—and the rpm's increase above the auto-tune rpm transition point or threshold, the controller uses the auto-tune band control method. (The rpm of the engine may be the may be a measurement of the number of times per minute components in the engine rotate (such as how fast the crankshaft is spinning) or may be a value correlated to, or related to, the number of times per minute the engine components rotate. The rpm may be determined directly or indirectly, such as via sensors or by measurements of pulse intervals.) In the auto-tune band control method, an auto-tune fuel adder is calculated and used to adjust the other portions of the total fuel adder based on algorithms discussed later that use differences between each pair of five adjacent pulses (FIG. 5) and whether, in the previously-modified pulse width, the other portion (the auto-tune-entering adder) of the total fuel adder was incremented or decremented by the auto-tune fuel adder.

In other aspects, discussed below, the add-on system selects a lower operational band based on the decrease in pulse widths and/or in rpm.

In an aspect of the invention, a method of determining the fuel supply to an electronically controlled fuel injected internal combustion engine, comprising the steps of connecting the add-on system between the ECU of the engine and a fuel injector of the engine is provided.

In an aspect of the invention an add-on control system controller determines the proper operating band to be used and passes a modified or an unmodified pulse to the fuel injector.

In an aspect of the invention an add-on control system includes circuitry, hardware, and/or software, termed "pulse information determination module," to measure characteristics of the ECU pulse.

In an aspect of the invention an add-on control system includes circuitry and hardware to modify and generate an output pulse with the width (duration of fuel injector opening) determined by the controller output.

An object of the present invention is to provide an add-on fuel injector control system and method that improves engine performance over the performance furnished by the stock ECU.

These and other objects, features, and advantages of the present invention will become more apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

FIG. 3 is a chart listing the components of the fuel adders in the various operational bands used in the method of improving the engine performance provided by the add-on fuel injector control system and method of the present invention.

Like reference numerals refer to like parts throughout the several views of the drawings.

DETAILED DESCRIPTION OF THE INVENTION

Figure 1:
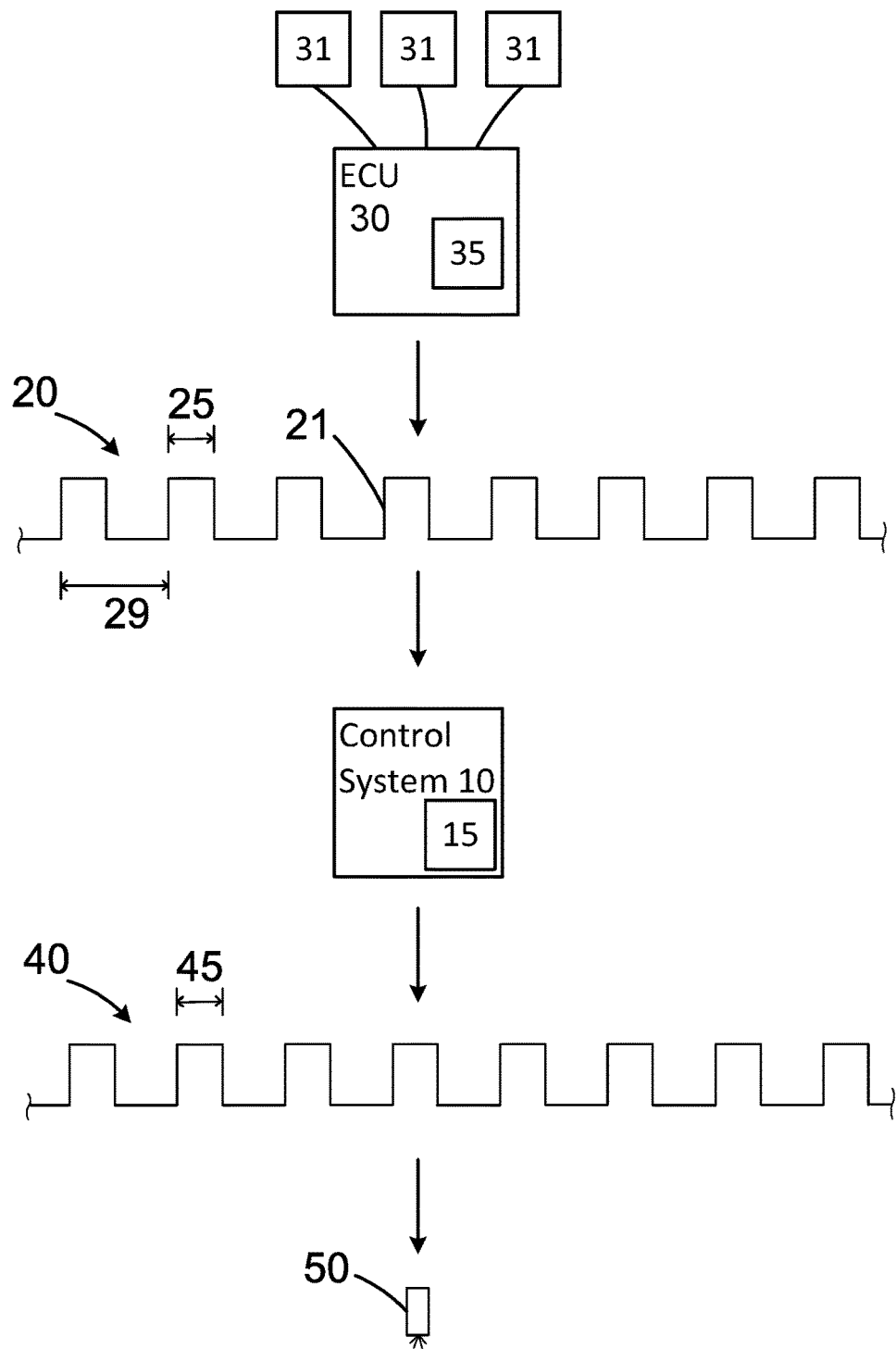
FIG. 1 is a diagram illustrating the interaction of the components of the add-on fuel injector control system and method of the present invention.

Shown throughout the figures, the present invention is directed toward an add-on electronic fuel injector control system 10 and a method to improve engine performance, which is illustrated diagrammatically in FIG. 1. The add-on control system 10 is used with an electronically-controlled fuel-injected internal combustion engine, where the engine includes an electronic control unit (ECU) 30 that sends an electrical impulse, the ECU pulse 20, to the fuel injector 50, thereby directing the fuel injector 50 to deliver the correct amount of fuel to the engine cylinder at the precise moment it is needed. The add-on control system 10 intercepts the ECU pulse 20 and passes a modified (increased or wider) or unmodified output pulse 40 to the fuel injectors 50.

The add-on control system 10 is useful for improving the operation of an internal combustion engine. The engine typically has a plurality of cylinders, a rotatable crankshaft, and an electronic control unit system including a stock ECU 30, which may be an OEM or after-market ECU. Each cylinder has at least one fuel injector 50. The ECU system controls the engine operation based on many factors, such as the specific engine structure, vehicle configuration, vehicle function, and engine variables such as cylinder pressure, exhaust temperature, crankshaft speed, angle, and torque. These and other variables can be monitored by commercially available electromagnetic and semiconductor sensors 31. The sensors 31 provide the raw data to the stock ECU microprocessor 35, which then processes the data in combination with pre-programmed information to determine the proper timing of the cylinder events such as intake and exhaust valve actuation and ECU pulses 20 directing the fuel injectors. Each ECU pulse 20 incorporates information regarding the timing of the leading edge 21 and width 25 of the ECU pulse 20. The pulse width 25 controls the length of time the fuel injector remains open.

As shown in the diagram of FIG. 1, the add-on control system 10 employed by the present invention receives or intercepts the pulses 20 that are output by the ECU 30. The system 10 includes a processor, microprocessor, or controller 15 to determine the optimum operational band, a pulse information determination module (shown as timing capture circuit 18, FIG. 2B) to measure relevant detailed information incorporated in the ECU pulses 20, and an output signal output device 17 (such as a switch-block/output pulse module) to provide an appropriate output pulse 40. Preferably the system 10 is ruggedized and suitable for installation near the engine of a vehicle.

The control system 10 constantly monitors (via the timing capture circuit 18) the information incorporated in the ECU pulses 20, which includes the fuel injector pulse widths 25 and the leading edges 21 of the pulses 20. (Optionally, the control system may also monitor the O2 sensors, as discussed later.) From the ECU pulse information incorporated in the ECU pulses 20, the controller 15 calculates the pulse-width intervals 29, preferably the leading-edge intervals (the time between successive openings of the fuel injector), which is the time between adjacent leading edges 21 (FIG. 1). The timing capture circuit 18 typically captures a pulse's high value and low value (representing the opening and closing of the fuel injector) and subtracts the two to obtain the pulse width value.

Though the system 10 is generally described for a single channel of the ECU pulse 20 intended to control a single fuel injector solenoid valve, it will be understood by the reader that if there are multiple injectors, each injector 50 in the modified engine will have its own channel and wiring, and that the channels will generally operate in a parallel and independent fashion while sharing some sub-systems as appropriate.

The ECU pulse 20, intended as input to activate a particular fuel injector's solenoid valve, may consist of individual power pulses or groups of power pulses per engine cylinder combustion stroke. The received ECU pulses 20 are modified (or in the pass-through band 60, passed along unmodified) as output pulses 40. The integrated area under the output pulse 40 (the pulse width 45) represents the total fuel quantity delivered to the combustion chamber by the fuel injector solenoid valve. This output pulse 40 typically may be one individual power pulse per combustion (of a width that varies), but may optionally consist of several spaced power pulses.

The add-on control system 10 provides four operating modes or bands that optimize engine performance during different vehicle conditions. As shown in FIG. 3, these are a pass-through band 60, a cruise band 70, an acceleration band 80, and a hunt or auto-tune band 90. In the cruise band 70, acceleration band 80, and the auto-tune band 90, the output pulse 40 is modified (increased) before being passed to the fuel injector 50. In the pass-through band 60, the output pulse 40 comprises a pulse commensurate or equal to the ECU pulse 20 output by the stock ECU. This commensurate pulse, which is passed on to the fuel injector 50, may be the original ECU pulse or may be a generated pulse that is equivalent to the original ECU pulse 20, both of which are referred to generally as "unmodified."

Figure 2A:
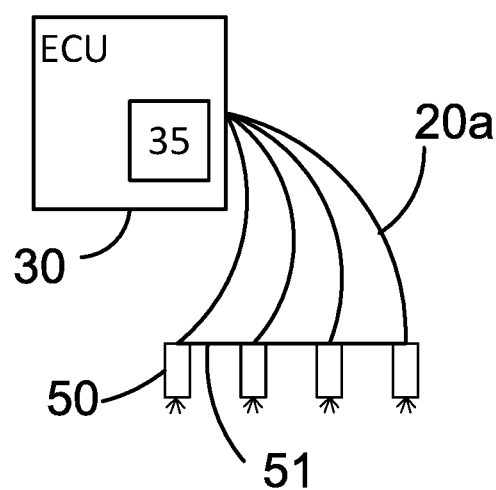
FIG. 2A is a diagram showing a prior art ECU controlling multiple fuel injectors before installation of the add-on fuel injector control system of the present invention.

Referring now to FIG. 2A, the engine to which this system is to be connected will include one or more fuel injectors 50 in the form of electrically operated valves. If the engine has multiple fuel injectors 50, generally the series of injectors 50 will all be connected to a common fuel supply rail 51 pressurized via a fuel pump, and to the ECU 30. Before installation of the add-on system 10, the stock ECU provides the normal or stock ECU pulse 20, which follows the circuit diagrammatically represented as line 20a to be received by the fuel injector 50.

Figure 2B:
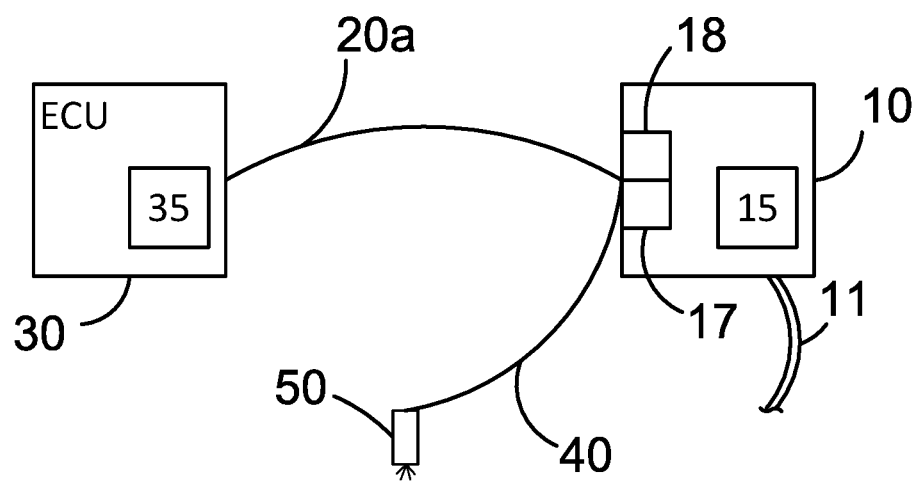
FIG. 2B is a diagram showing an ECU and one fuel injector with the add-on fuel injector control system of the present invention installed.

As seen in FIG. 2B, after installation of the add-on control system 10, the ECU pulse 20 is intercepted by the add-on control system 10 with the diagrammatically represented circuit 20a then connected to the add-on control system 10.

To install the add-on control system 10, power 11 is supplied from the engine to the control system 10, and a wiring harness (shown as circuits 20a and 40) intercepts the ECU pulse 20, directs the signal 20 to the control system 10, and connects the control system 10 to the fuel injector 50. Optionally but preferably, a fail-safe pass-through circuit is also provided (such as via a closed-on-power-loss switch inside the switch-block/output pulse module 17 incorporated in the add-on control system 10 package) along with, or incorporated into, circuits 20a and 40. Circuits 20a and/or 40 may be formed partially or totally with new wiring from the system's wiring harness or may be formed partially or totally from the pre-existing wiring.

Thus, the add-on system 10 is connected via the wiring harness (optionally, including some pre-existing wiring) between the ECU 30 and the fuel injectors 50. The normal circuit 20a from the ECU 30 to the fuel injector 50 is interrupted and circuit 40 is added. Preferably, the wiring harness is configured to ensure that the changes made to the injector control circuit characteristics by its insertion are negligible.

The controller 15 of the add-on control system 10 decides which of the four operating bands is appropriate for use during differing engine conditions. This determination is based on engine rpm and pulse width, but, at startup, it is additionally based on the number of initial injection cycles that have occurred from startup.

Initially, upon startup, the add-on controller operates in the pass-through band 60 (FIG. 4) in which it allows the ECU pulse 20 (including the ECU pulse width 25 and pulse leading edge 21) from the ECU 30 to be passed through to the fuel injectors 50 without modification until a set of parameters or thresholds are met. To allow for fail-safe operation, this pass-through circuit may be independent of the control system processor 15 (implemented via a closed-on-power-loss switch inside the switch-block/output pulse module 17), but may optionally be implemented as a non-fail-safe pseudo pass-through circuit by transmitting the ECU pulse 20 to the processor 15, which would then output an identical signal to the fuel injector 50. The non-processor-dependent pass-through band 60 allows the vehicle to start up more easily and serves as a fail-safe mechanism to allow the vehicle to run if the other circuitry in the control system 10 should fail.

Figure 4:
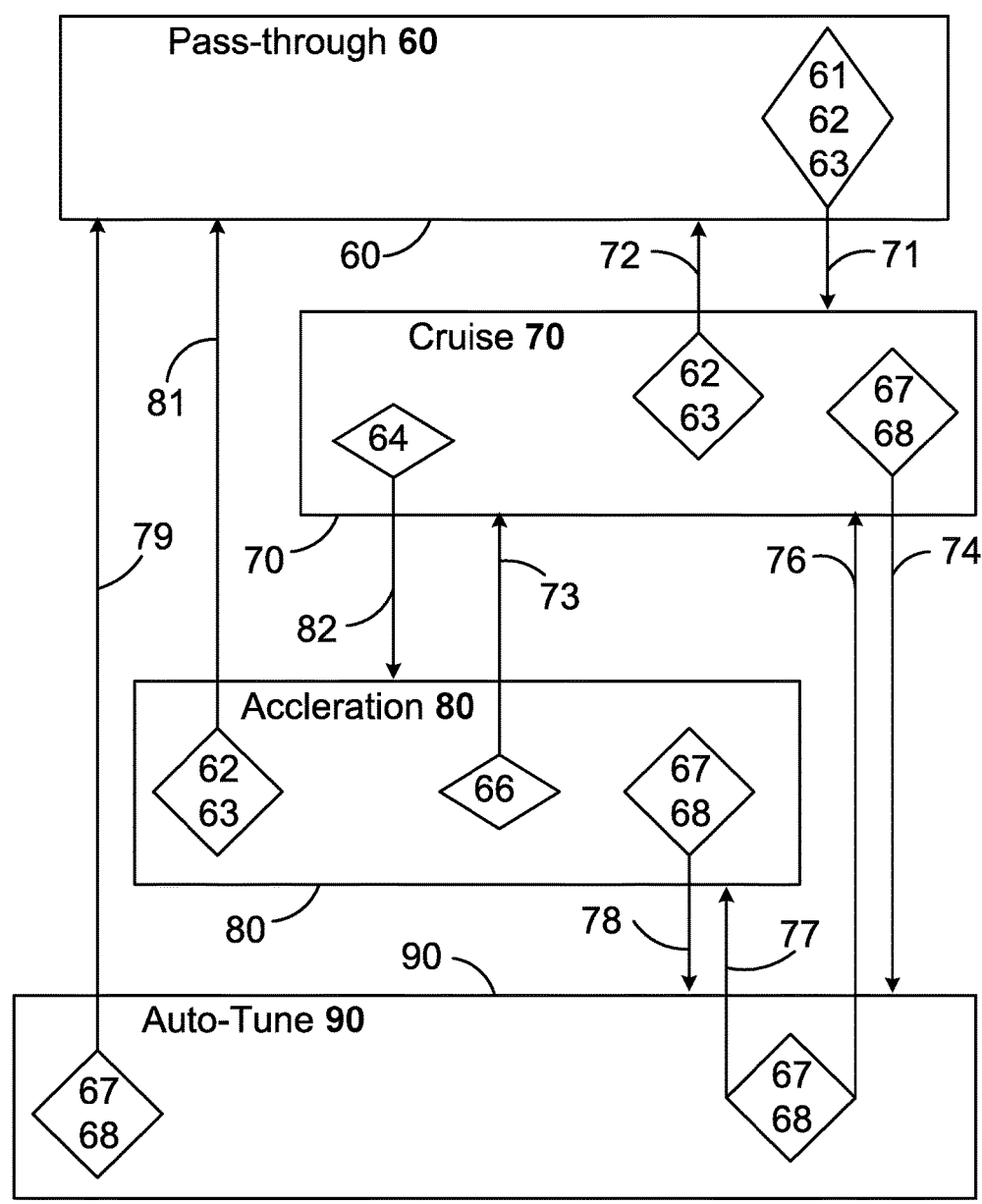
FIG. 4 is a diagram to aid in understanding the thresholds used in the determinations of which operational band output is to be used by the add-on fuel injector control system and method of the present invention.

As seen in FIG. 4, upon startup, the controller 15 allows the unmodified pulse to be passed through the circuit in the pass-through operating mode 60 until all the following thresholds are met: (1.) a pre-determined number of valid fuel injections 61 have occurred (for example, between 150 and 300 injections and preferably 250 injections); (2.) the controller 15 detects an rpm above a pre-defined minimum cruise rpm 62 that is defined in the settings (which may be, for example, between 500 and 2000 rpm, depending on the particular application, with a typical minimum cruise rpm of 750 rpm); and (3.) the received duration of the ECU pulse width 25 is greater than or equal to a pre-determined cruise pulse width threshold 63 (such as between 0.5 to 2 milliseconds (ms), and preferably 1 ms). After the controller 15 detects that these three thresholds 61, 62, 63 have been met, the add-on control system 10 begins to operate in the cruise mode 70. The change from pass-through band 60 to cruise band 70 is represented by diagram line 71 (FIG. 4).

In the cruise band 70, the processor 15 begins active control of the fuel injectors 50 while monitoring the ECU pulse 20 to obtain the pulse width 25 and leading edge 21. As seen in FIG. 3, while operating in the cruise band 70, a cruise band fuel adder 75 is calculated and added to the original ECU pulse width 25 to generate the output pulse width 45. Preferably, this cruise band fuel adder 75 is calculated as a percentage of the ECU control signal pulse width 25, where the percentage is controlled by a value set in the settings. The cruise band fuel adder 75 may vary from between 1 to 25% of the ECU pulse width 25, depending on the application. For instance, if the add-on control system 10 is installed in a motorcycle, the percentage varies based on the make, model, year, and even equipment changes, such as changing the type of air cleaner. In an example, if the ECU control signal pulse width 25 is 3 ms and the percentage set in the settings is 10%, the cruise fuel adder 75 (which in the cruise band 70 is equal to the total fuel adder 55) would be 0.3 ms, and the total output pulse width 45 sent to the fuel injectors 50 would be 3.3 ms.

While in the cruise band 70, the add-on control system 10 continues calculating the cruise fuel adder 75, and continues outputting the output pulse width 45 (the cruise fuel adder 75 plus the original pulse width 25) until one of the following events occur: (1.) the rpm drops below the pre-defined minimum cruise threshold rpm 62; (2.) the ECU control signal pulse width 25 drops below the cruise pulse width threshold 63 (preferably dropping under 1 ms); or (3.) the ECU control signal pulse width 25 increases above an acceleration pulse-width transition threshold 64 that has been pre-defined in the settings. The acceleration transition point 64 may be in the range of 5 to 15 ms, with 6 to 8 ms a typical setting.

If either the rpm drops below the minimum cruise rpm threshold 62 defined by the settings or the ECU injector pulse width 25 drops below the cruise pulse width threshold 63, the pass-through band 60 becomes active, represented diagrammatically by line 72, and the processor 15 relinquishes active injector control back to the pass-through circuitry.

If the received ECU control signal pulse width 25 increases above the settings-defined acceleration pulse-width transition threshold or point 64 (FIG. 4), the acceleration band 80 is entered (line 82), and the cruise band fuel adder 75 is increased by an acceleration adder amount 85 (FIG. 3). The acceleration adder 85 is added to the cruise band fuel adder 75 to generate the total fuel adder 55, as seen in FIG. 3. The total fuel adder 55 is then added to the ECU control signal pulse width 25. The acceleration adder 85 is a time value defined in the settings, which may be from 0.1 to 3 ms. Continuing with the above example, if the acceleration adder 85 is set at 2 ms and the control system 10 is operating in the acceleration band 80, the total fuel adder 55 is 0.3 ms plus 2 ms, which is added to the ECU pulse width 25 and transmitted to the injectors 50 real time as the output pulse width 45. If the ECU pulse width 25 remains above the acceleration transition point 64 for more than a preprogrammed acceleration threshold number of injection cycles 66 (which are programmable in settings), the system control regresses (line 73) from the acceleration band 80 to the cruise band 70. In this case, the acceleration adder 85 is removed from the total fuel adder 55, thereby reverting the total fuel adder 55 back to equal to the cruise fuel adder 75. In the above example, the 2 ms of the acceleration adder 75 is removed from the total fuel adder 55, and the total fuel adder 55 (which is equal to the cruise fuel adder 75) is 0.3 ms.

The fourth operating mode is the hunt band or auto-tune band 90. The control system 10 enters the auto-tune band 90, when both of the following steps occur: (1.) the ECU pulse width increases above the auto-tune pulse-width transition point 67 defined in settings; and (2.) the rpm's have increased above the auto-tune threshold rpm's setting 68. The control system 10 uses the auto-tune-entering adder as the start point for hunting and as a base value carried forward. (Note that the auto-tune-entering adder is the cruise adder 75 plus the acceleration adder 85, when moving into the auto-tune band 90 from the acceleration band 80, but is only the cruise adder 75, when moving into the auto-tune band 90 from the cruise band 70, as denoted by the parentheses in FIG. 3.) Using the auto-tune-entering adder allows for a smooth transition into the auto-tune band. The auto-tune-entering adder is adjusted up and down by the auto-tune adder 95 to create the current total fuel adder 55 per the algorithm discussed below by continuously monitoring the leading-edge intervals 29. The auto-tune step size is initially started from a value determined by the parameter set in the settings. Optionally, the step size can be dynamically modified by the controller 15.

Based on a result correlated to the rate of acceleration, the total fuel adder 55 is dynamically upwardly modified by adding or subtracting the auto-tune adder 95 to or from the auto-tune-entering adder to achieve the optimum acceleration by the addition or subtraction of the sized step. This dynamic modification enables the auto-tune band 90 to adjust the output pulse width 45 in real time to meet the demands of the vehicle and outside influences, such as gear changes, wind and road grade.

If the ECU pulse width falls below the auto-tune transition point 67 or the rpm's fall below the pre-defined auto-tune rpm threshold 68, the system 10 reverts (shown diagrammatically as line 76, 77, or line 79) to the band in which it was operating before the system 10 entered the auto-tune band 90.

If the controller 15 determines the operation mode to be the auto-tune band, it modifies the ECU pulse width 25 to generate an output pulse width 45 based on the result correlated to the rate of acceleration, i.e., on whether there is a faster or slower change of rate of acceleration (by comparing a previous and a current value correlating to the rate of change of the acceleration) and based on whether, in the previous total fuel adder 55, the auto-tune-entering adder was incremented or decremented by the auto-tune fuel adder 95.

In the auto-tune band 90, the controller 15 constantly monitors the ECU pulses 20 and uses the leading edges 21 to calculate values having a correlation to the rate of change of acceleration. A preceding value correlated to the rate of change of acceleration (R1 or r1) and a current value correlated to the rate of change of acceleration (R2 or r2) are calculated and compared to determine if the value having a correlation to the rate of change of acceleration is increasing or decreasing. Various methods to calculate the result correlated to the rate of change of acceleration may be used, but two exemplary methods are presented. The values correlating to the rate of acceleration that are calculated by the controller 10 may be a value having a correlation to the rate of change of the acceleration or may preferably be considered as the second derivative of the period $\{\Delta(\Delta[\text{period}]/\Delta T)\Delta T\}$, where the period is the time interval between equivalent points of the pulse (which is herein discussed as the leading-edge interval 29). To aid the reader in conceptual understanding, the calculation of the values having a correlation to the rate of acceleration will be discussed first, as illustrated in FIG. 5.

Figure 5:
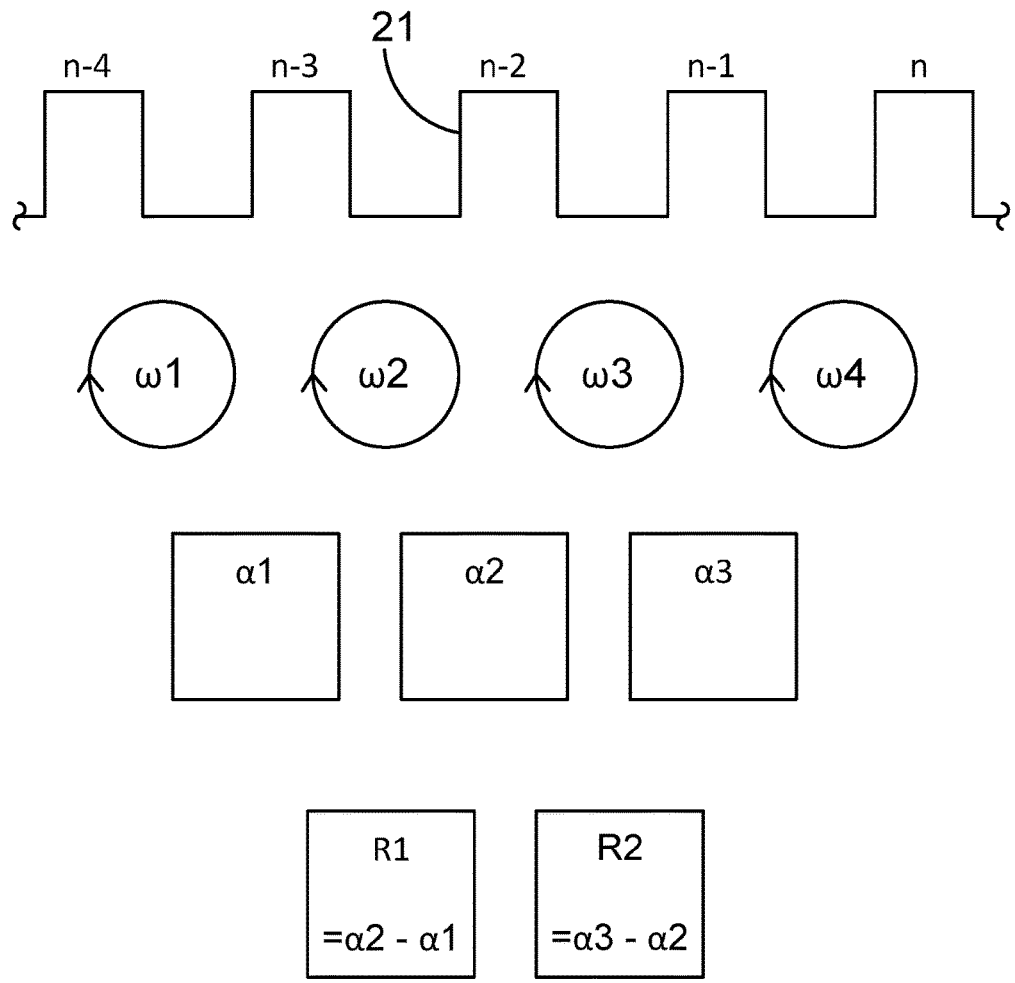
FIG. 5 is a diagram to aid in understanding the concepts behind the auto-tune band of the add-on fuel injector control system of the present invention.
Figure 6:
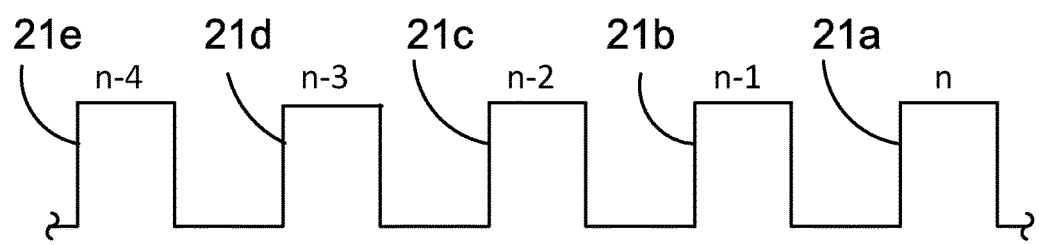
FIG. 6 is a diagram to aid in understanding the algorithm of the auto-tune band of the add-on fuel injector control system of the present invention.

To calculate the values having a correlation to the rate of change of acceleration, the controller 10 must receive a series of five ECU pulses 20, which are labeled as pulses n−4, n−3, n−2, n−1, and n on FIGS. 5-6. The angular velocity ω is then calculated using the pulse characteristics (generally leading edges 21) of adjacent pulses. From the angular velocity ω, the values having a correlation to the angular acceleration α are calculated. Using the values correlated to the angular acceleration α, values correlated to the rate of change of acceleration R1, R2 are calculated. The current value correlated to the rate of change of acceleration is compared to the immediately prior value correlated to the rate of change of acceleration.

More specifically, as seen in FIG. 5, the five pulses, n−4, n−3, n−2, n−1, and n are received by the controller 10. The controller calculates values correlated to the angular velocity ω1, ω2, ω3, ω4, and then calculates values correlated to the acceleration α1, α2, α3. The prior change in the value correlated to the acceleration is calculated by subtracting α1 from α2 (α2−α1), and, allowing that the time is relatively constant, the preceding value correlated to the rate of change in acceleration R1, can be represented by α2−α1. The current value correlated to the rate of change in acceleration is calculated by subtracting α2 from α3 (α3−α2), and, allowing that the time is relatively constant, the current value correlated to the rate of change of acceleration R2, can be represented by α3−α2. Then the prior value correlated to the rate of change of acceleration R1 is compared to the current value correlated to the rate of change of acceleration R2. If R2 is larger than R1, the value correlated to the rate of change of acceleration is increasing. If R2 is smaller than R1, the value correlated to the rate of change of acceleration is decreasing. Once it is determined whether the value correlated to the rate of change of acceleration is increasing or decreasing, a decision matrix is used to determine whether to add the auto-tune adder 95 to the auto-tune-entering adder or to subtract it from the auto-tune-entering adder to generate the current total fuel adder 55.

If the value correlated to the rate of change of acceleration is increasing and, in the previous total fuel adder 55, the auto-tune-entering adder had been incremented by the auto-tune step size of the auto-tune adder 95, then the auto-tune-entering adder is increased by the auto-tune step size. If the value correlated to the rate of change of acceleration is increasing and, in the previous total fuel adder 55, the auto-tune-entering adder had been decremented by the auto-tune step size of the auto-tune adder 95, then the auto-tune-entering adder is decreased by the auto-tune step size.

If the value correlated to the rate of change of acceleration is shown to be decreasing and, in the previous total fuel adder 55, the auto-tune-entering adder had been incremented by the auto-tune step size of the auto-tune adder 95, then the auto-tune-entering adder is decreased by the auto-tune step size. If the value correlated to the rate of change of acceleration is decreasing and, in the immediately previous total fuel adder 55, the auto-tune-entering adder had been decremented by the auto-tune step size of the auto-tune adder 95, then the auto-tune-entering adder is increased by the auto-tune step size, thereby creating the current total fuel adder 55.

This is detailed in the following determination matrix, which includes the following steps:

(a.) if R1<R2 and if, in the preceding total fuel adder 55, the auto-tune-entering adder was incremented by the auto-tune fuel adder 95, then add the auto-tune adder 95 (of the auto-tune step size) to the auto-tune-entering adder to generate the current total fuel adder 55, with the current total fuel adder 55 then added to the ECU pulse width 25 to generate the current output pulse width 45;

(b.) if R1<R2 and if, in the preceding total fuel adder 55, the auto-tune-entering adder was decremented by the auto-tune fuel adder 95, then decrease the auto-tune-entering adder by the auto-tune adder 95 step size;

(c.) if R1>R2 and if, in the preceding total fuel adder 55, the auto-tune-entering adder was incremented by the auto-tune fuel adder 95, then decrease the auto-band-entering total fuel adder 55 by the auto-tune adder 95 step size;

(d.) if R1>R2 and if, in the preceding total fuel adder 55, the auto-tune-entering adder was decremented by the auto-tune fuel adder 95, then add the auto-tune adder 95 (of the auto-tune step size) to the auto-tune-entering adder to create the current total fuel adder 55;

(e.) if R1=R2 and if, in the preceding total fuel adder 55, the auto-tune-entering adder was decremented by the auto-tune fuel adder 95, then add the auto-tune adder 95 (of the auto-tune step size) to the auto-tune-entering adder; and (f.) if R1=R2 and if, in the preceding total fuel adder 55, the auto-tune-entering adder was incremented by the auto-tune fuel adder 95, then decrease the auto-tune-entering adder by the auto-tune adder 95 step size.

Turning to FIG. 6, the second, preferred exemplary method to calculate the result correlated to the rate of change of acceleration, four successive leading-edge intervals are calculated by the controller 15 from the leading edges 21a, 21b, 21c, 21d, 21e of pulses n, n−1, n−2, n−3, and n−4, respectively, and are used by the controller 15 in the equations below to generate the output pulse 40.

The controller 10 preferably calculates a value that correlates to the rate of change of acceleration, which in this case is inversely proportional to the rate of acceleration. It could be viewed as the second derivative of the period $\{\Delta(\Delta[\text{period}]/\Delta T)\Delta T\}$ or the first derivative of the rate of change of the period $\{\Delta(\text{rate of change of the period})\Delta T\}$. Neglecting the relatively small changes in the denominators, a proportional result can be calculated directly from leading edge time values by the following steps:

(1.) determine the difference $\Delta T_{n-3}$ between leading edge n−4 21e and leading edge n−3 21d;

(2.) determine the difference $\Delta T_{n-2}$ between leading edge n−3 21d and leading edge n−2 21c;

(3.) determine the difference $\Delta T_{n-1}$ between leading edge n−2 21c and leading edge n−1 21b;

(4.) determine the difference $\Delta T_n$ between leading edge n−1 21b and leading edge n 21a;

(5.) calculate r1, a prior value correlating to the rate of change of acceleration, using the equation $r1=\Delta T_{n-3}-2(\Delta T_{n-2})+\Delta T_{n-1}$, which is equivalent to the equation $r1=(\Delta T_{n-3}-\Delta T_{n-2})-(\Delta T_{n-2}-\Delta T_{n-1})$;

(6.) calculate r2, a current value correlating to the rate of change of acceleration, using the equation $r2=\Delta T_{n-2}-2(\Delta T_{n-1})+\Delta T_n$ or an equivalent equation;

(7.) use the pulse width determination matrix to increment or decrement the total fuel adder 55 by the value of the step size of the auto-tune adder 95; and (8.) send the output pulse width 45 to the fuel injector 50.

The determination matrix used when using the above algorithm consists of the following steps:

(a.) if r1>r2 and if, in the preceding modified pulse width, the fuel adder 95 was added to the auto-tune-entering adder, then add the auto-tune adder 95 (of the auto-tune step size) to the auto-tune-entering adder to generate a current total fuel adder 55, with the current total fuel adder 55 then added to the pulse width of the current ECU pulse n;

(b.) if r1>r2 and if, in the preceding pulse width, the fuel adder 95 was decremented from the auto-tune-entering adder, then decrease the auto-tune-entering adder by the auto-tune adder 95 step size to generate the current total fuel adder 55;

(c.) if r1<r2 and if, in the preceding pulse width, the auto-tune fuel adder 95 was added to the total fuel adder 55, then decrement the total fuel adder 55 by the auto-tune adder 95 step size;

(d.) if r1<r2 and if, in the preceding pulse width, the auto-tune fuel adder 95 was decremented from the auto-tune-entering adder, then add the auto-tune adder 95 (of the auto-tune step size) to the auto-tune-entering adder;

(e.) if r1=r2 and if, in the preceding pulse width, the preceding fuel adder 95 was decremented from the auto-tune-entering adder, then add the auto-tune adder 95 (of the auto-tune step size) to the auto-tune-entering adder; and (f.) if r1=r2 and if, in the preceding pulse width, the auto-tune fuel adder 95 was added to the auto-tune-entering adder, then decrease the auto-tune-entering adder by the auto-tune adder 95 step size to generate the current total fuel adder 55, which is then added to the pulse width of pulse n.

Using the auto-tune band 90 allows the control system 10 to anticipate the natural variations in the engine and vehicle conditions, environment and demands. These natural variations can cause erratic operations in other systems, but the control system 10 uses the auto-tune band to counteract the natural variations by predicting the unwanted variation using a result correlated to the rate of change of acceleration.

The programming of the controller 15 provides a means for inputting a variety of operational mode settings that are used in the calculations and determinations made by the controller 15. Default settings are preferably set by the manufacturer before purchase. Some or all the default settings may be the same for multiple types or models of vehicles, or some or all may be different for different types and models of vehicles. Inputting the operational mode settings may include setting or modifying a value for one or more of the following parameters: the auto-tune step size, a threshold value for a predetermined number of valid initial fuel injection cycles 61, a minimum cruise threshold rpm threshold 62, an acceleration transition point 64, the percentage used in the calculation of the cruise band fuel adder 75, the value of the acceleration adder 85, the preprogrammed number of injection cycles 66, the auto-tune transition point 67, the auto-tune threshold rpm's setting 68, the settings that control the O2 sensor signal modifications, and other parameters. The programmable settings may also include a floor bound and a ceiling bound by which the fuel adder 95 is bounds checked before generating the current output pulse width 45.

Some or all the default settings may be modifiable by the end user. Preferably a mobile app is provided by which the user can conveniently modify the settings.

In a further aspect of the invention, in all bands, including the pass-through band 60, the O2 (oxygen) sensors (if the system is equipped with O2 sensors) are monitored by the control system 10, and their signal is modified to appear slightly leaner to the ECU. This causes the ECU to respond with slightly richer fueling, enabling the engine to run cooler and closer to an ideal air fuel ratio. The settings that control the O2 sensor signal modification are modifiable by the manufacturer and/or the end user.

Another aspect of the control system 10 is the optional integration of an O2 signal modification system and method that modifies the output oxygen sensor data. The addition of this aspect to the invention is advantageous because, as the technology used in the vehicle ECU's of modern vehicles has improved, existing methods of modifying oxygen sensor data to improve performance and emissions fail to work. These older methods include biasing the sensor voltage, using resistor dividers to modify the sensor voltage and other methods, which do not work well because they output modified signals that do not meet the validity and timing standards required by modern ECU's. And, because the ECU processors have become faster and more powerful, they can continuously check the validity and timing of the oxygen sensor signals and will discard any signal that does not meet the proper standards.

Figure 7:
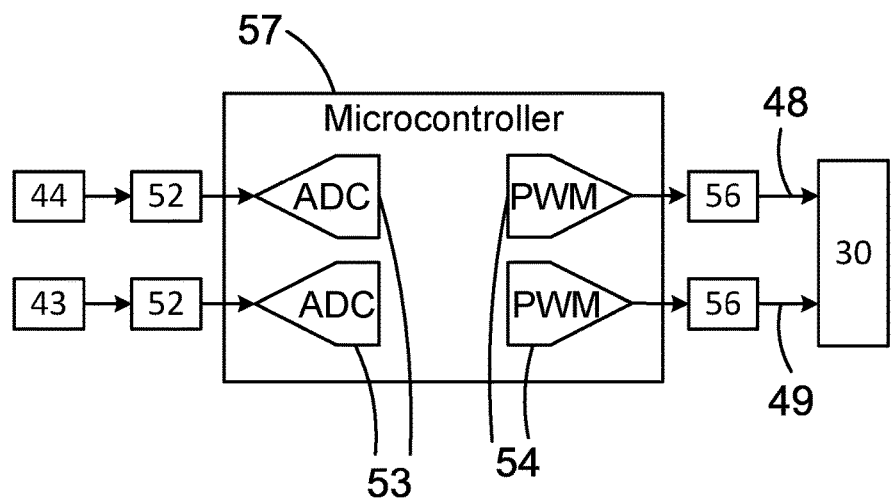
FIG. 7 is a diagram of the O2 sensor input into the add-on fuel injector control system of the present invention.

The instant method of modifying the signal, however, does not interfere with the ECU's monitoring of the oxygen sensors signals. The method used keeps the timing of the modified signal coherent with the timing of the sensor's signal. In addition, the voltage level of the sensor's signal is duplicated in the modified signal. This is done utilizing a microprocessor 57 (FIG. 7) with one or more analog to digital converters (ADC) 53 for sampling the signal from the oxygen sensor and pulse width modulators (PWM) 54 to supply the modified output pulse to the ECU.

The signal from the oxygen sensor is low pass filtered 52 and sampled by the micro-processor's ADC 53 for high and low levels. Typically, a high signal indicates the exhaust sample is rich, such as below a 14.7 air-to-fuel ratio, and a low signal indicates that the exhaust sample is lean, such as above a 14.7 air-to-fuel ratio. However, in some applications, such as in some types of motorcycles, the typical situation may be inverted. The ECU detects this signal and modifies the fuel added accordingly to arrive at the desired air-to-fuel ratio. By modifying this ratio, a modified signal is sent to the ECU via the PWM 54 and filter 56, causing it to appear leaner or richer as desired.

This is accomplished by the software of the microcontroller 57 holding the signal high for a period of time after the transition of the existing signal, if it is desired to make the AFR leaner, or holding the signal low for a period of time after the transition of the existing signal, if it is desired to make the AFR richer. The length of time the signal is held controls the amount of modification.

The add-on fuel injector control system of the instant invention is herein described as used with a four-stroke internal combustion engine, particularly a motorcycle engine, but the invention is applicable to other engines with various configurations and in various types of vehicles. The internal combustion engine may comprise a single combustion chamber or may have two, four, eight or other numbers of chambers or cylinders in which the fuel is combusted. The engine may operate using various power cycles, including a two-stroke cycle, and may operate on any of various fuels, such as gasoline, diesel, or hybrid systems. The engine may be used to power any of varying types of vehicles, such as a car, truck, boat, off-road vehicle, motorcycle, or the like, but has particular applicability to a motorcycle engine.

The engine includes an air intake system and a fuel system. Typically, the air intake system, located directly behind the front grill, includes an intake air tube into which air is drawn, a mass flow sensor to determine the mass of the air, an air filter housing, one or more air filters to filter the air, a throttle body, and one or more air channels that serve to convey the air to the combustion chamber(s). The fuel system may include one or more fuel pumps that deliver fuel from a fuel tank through one or more fuel delivery lines to the electronically controlled fuel injector or injectors 50, which are typically connected to a fuel rail 51. A vacuum-powered fuel pressure regulator attached to the fuel rail 51 ensures that the fuel pressure in the rail 51 remains constant. The fuel injectors 50 are connected to the rail 51 with their valves remaining closed until the output pulse 40 (typically a pulsing ground) is sent to the injector 50, which closes the circuit and provides the injector's solenoid with current to open the injector valve. Due to the high pressure in the rail, opening the valve sends fuel at a high velocity through the injector's spray tip. The duration that the valve is open—and, therefore, the amount of fuel sent into the cylinder—depends on the width of the output pulse 40 (typically the ground signal). When the valve is opened, the injector 50 discharges fuel through the spray tip and into either the intake manifold, just upstream of the intake valve, or directly into the cylinder.

The exhaust system includes at least an exhaust channel that allows the combustion waste to leave the combustion chamber. Typically, the exhaust system may include an exhaust valve, a catalytic converter, an exhaust pipe and a muffler. The exhaust valve, located in the cylinder head, opens after the combustion stroke of the piston and allows the exhaust gas to pass to the exhaust manifold. The exhaust manifold carries the waste from the combustion process to the catalytic converter, which partially cleans the exhaust gas to reduce the emissions. The exhaust pipe then carries the exhaust gas from the catalytic converter to the muffler, which is configured to reduce the noise of the ejection of the exhaust gases into the air.

The ECU herein discussed may be embodied in or comprise any of a variety of devices, such as an engine management computer, powertrain control module (PCM), engine control module (ECM), injection control unit, digital motor electronics (DME), digital diesel electronics (DDE), or the like.

The width of the pulses may be changed by modifying the leading edge of the pulse (leading edge modulation), modulating the trailing edge of the pulse (trailing edge modulation), or by modifying both the leading edge and the trailing edge of the pulse (dual edge modulation). In some embodiments modulating the leading edge may have a much weaker effect than an equivalent modulation of the trailing edge.

The invention illustratively disclosed herein suitably may be practiced in the absence of any element which is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method to provide a control signal to a fuel injector comprising:

receiving, from an electronic engine control unit (ECU), ECU pulses; wherein each of said ECU pulses comprises ECU pulse characteristics comprising at least an ECU control signal pulse width and a leading edge;

accepting input operational mode settings;

determining a value correlated to a current revolutions per minute (rpm) of an engine's crankshaft;

determining a selected operational band from a plurality of operational bands based on said value correlated to said current rpm, said ECU pulse characteristics, and said operational mode settings; wherein said plurality of operational bands comprise an auto-tune band;

modifying, when in said auto-tune band, an amount of fuel delivered by said fuel injector to an internal combustion engine by increasing said ECU control signal pulse width of a current one of said ECU pulses by adding a current total fuel adder to said ECU control signal pulse width to calculate an output pulse width;

calculating a value correlated to the rate of change of acceleration, wherein said value correlated to the rate of change of acceleration comprises the second derivative of a period $\{\Delta(\Delta[period]/\Delta T)\Delta T\}$;

determining a value of said current total fuel adder based on said value correlated to the rate of change of acceleration; and outputting said output pulse width to said fuel injector.

2. The method to provide a control signal to a fuel injector, as recited in claim 1, wherein said plurality of operational bands further comprise a pass-through band, a cruise band, and an acceleration band, said method further comprising:

maintaining, unmodified, said amount of fuel delivered by said fuel injector to an internal combustion engine by passing said current one of said ECU pulses to said fuel injector unmodified, if said selected operational band is determined to be said pass-through band;

modifying said amount of fuel delivered by said fuel injector to an internal combustion engine by increasing said ECU control signal pulse width of said current one of said ECU pulses by adding said current total fuel adder to said ECU control signal pulse width, if said operational band is determined to be one of said cruise band, said acceleration band or said auto-tune band; wherein, when in said auto-tune band, said current total fuel adder comprises an auto-tune-entering adder that is incremented or decremented by an auto-tune fuel adder; and determining, when in auto-tune band, whether to add said auto-tune fuel adder to said auto-tune-entering adder or to subtract said auto-tune fuel adder from said auto-tune-entering adder based on a comparison of a current one of said value correlated to the rate of change of acceleration and a previous one of said value correlated to the rate of change of acceleration.

3. The method to provide a control signal to a fuel injector, as recited in claim 2, wherein:

said operational mode settings comprise a minimum cruise rpm threshold value, a cruise pulse-width threshold value, an acceleration pulse-width transition threshold value, an auto-tune pulse-width transition threshold value, and an auto-tune rpm threshold value;

said cruise band is selected based on at least said minimum cruise rpm threshold value and said cruise pulse-width threshold value;

said acceleration band is selected based on said acceleration pulse-width transition threshold value; and said auto-tune band is selected based on said auto-tune pulse-width transition threshold value and said auto-tune rpm threshold value.

4. The method to provide a control signal to a fuel injector, as recited in claim 3, wherein said operational mode settings further comprise a threshold value of initial fuel injection cycles, the method further comprising:
at initial startup, selecting said pass-through band;
at initial startup, counting ECU fuel injection cycles to determine an initial fuel injection cycle running total; and
maintaining said pass-through band until said ECU control signal pulse width is greater than said cruise pulse-width threshold value, said value correlated to said current rpm is greater than said minimum cruise rpm threshold value, and said initial fuel injector cycle running total is greater than said threshold value of initial fuel injection cycles.

5. The method to provide a control signal to a fuel injector, as recited in claim 3, further comprising, when operating in said cruise band and wherein said current total fuel adder comprises only said cruise band fuel adder:
maintaining selection of said cruise band until one of the following occur:
(1.) if said ECU control signal pulse width becomes greater than said acceleration pulse-width transition threshold value, changing selection to said acceleration band;
(2.) if said ECU control signal pulse width becomes less than said cruise pulse-width threshold value and said value correlated to said current rpm becomes less than said minimum cruise rpm threshold value, changing selection to said pass-through band;
(3.) if said ECU control signal becomes greater than said auto-tune pulse-width transition threshold value and said value correlated to said current rpm is greater than said auto-tune rpm threshold, changing selection to said auto-tune band.

6. The method to provide a control signal to a fuel injector, as recited in claim 3, further comprising, when operating in acceleration band and wherein said current total fuel adder comprises only said cruise band fuel adder plus an acceleration band adder:
maintaining operation in said acceleration band until one of the following occur:
(1.) if said ECU control signal pulse width remains greater than said acceleration pulse-width transition threshold value for more than said acceleration threshold number of injection cycles, changing selection to said cruise band;
(2.) if said ECU control signal pulse width becomes less than said cruise pulse-width threshold value and said value correlated to said current rpm becomes less than said minimum cruise rpm threshold value, changing selection to said pass-through band;
(3.) if said ECU control signal becomes greater than said auto-tune pulse-width transition threshold value and said value correlated to said current rpm is greater than said auto-tune rpm threshold, changing selection to said auto-tune band.

7. The method to provide a control signal to a fuel injector, as recited in claim 3, further comprising, when operating in auto-tune band:
maintaining operation in said auto-tune band until said ECU control signal becomes less than said auto-tune pulse-width transition threshold value or said value correlated to said current rpm becomes less than said auto-tune rpm threshold; and then reverting to said selected operational band in which said system was operating before entering said auto-tune band.

8. The method to provide a control signal to a fuel injector, as recited in claim 1, further comprising:
calculating a preceding value correlated to the rate of change of acceleration;
calculating a current value correlated to the rate of change of acceleration;
comparing said preceding value correlated to the rate of change of acceleration to said current value correlated to the rate of change of acceleration to generate a comparison result; and
incrementing or decrementing an auto-tune-entering adder by an auto-tune fuel adder based on said comparison result to generate said current total fuel adder.

9. The method to provide a control signal to a fuel injector, as recited in claim 1, further comprising, when in auto-tune band, determining whether to add an auto-tune fuel adder to an auto-tune-entering adder or to subtract said auto-tune fuel adder from said auto-tune-entering adder based on a comparison of a current one of said value correlated to the rate of change of acceleration and a previous one of said value correlated to the rate of change of acceleration.

10. The method to provide a control signal to a fuel injector, as recited in claim 1, wherein said ECU pulses comprise an n ECU pulse, an n−1 ECU pulse, an n−2 ECU pulse, an n−3 ECU pulse, and an n−4 ECU pulse, said method further comprising:
receiving said n−4 ECU pulse including an n−4 ECU control signal pulse width and an n−4 leading edge from said ECU;
receiving said n−3 ECU pulse including an n−3 ECU control signal pulse width and an n−3 leading edge from said ECU;
receiving said n−2 ECU pulse including an n−2 ECU control signal pulse width and an n−2 leading edge from said ECU;
receiving said n−1 ECU pulse including an n−1 ECU control signal pulse width and an n−1 leading edge from said ECU;
receiving said n ECU pulse including an n ECU control signal pulse width and an n leading edge from said ECU;
calculating the difference $\Delta T_{n-3}$ between said leading edge n−4 and said leading edge n−3;
calculating the difference $\Delta T_{n-2}$ between said leading edge n−3 and said leading edge n−2;
calculating the difference $\Delta T_{n-1}$ between said leading edge n−3 and said leading edge n−2;
calculating the difference $\Delta T_n$ between said leading edge n−1 and said leading edge n;
calculating a preceding value correlated to the rate of change of acceleration r1 using the equation $\{\Delta(\Delta[period]/\Delta T)\Delta T\}$;
calculating a current value correlated to the rate of change of acceleration r2 using the equation $\{\Delta(\Delta[period]/\Delta T)\Delta T\}$; and
using a determination matrix to increment or decrement an auto-tune-entering adder by said auto-tune step value.

11. A method to provide a control signal to a fuel injector comprising:
receiving, from an electronic engine control unit (ECU), ECU pulses; wherein each of said ECU pulses comprises ECU pulse characteristics comprising at least an ECU control signal pulse width and a leading edge;

receiving input operational mode settings;

determining a value correlated to a current revolutions per minute (rpm) of an engine's crankshaft;

determining a selected operational band from a plurality of operational bands based on said value correlated to said current rpm, said ECU pulse characteristics, and said operational mode settings; wherein said plurality of operational bands comprise a cruise band, an acceleration band, and an auto-tune band;

increasing said ECU control signal pulse width of said current one of said ECU pulses by adding a current total fuel adder to said ECU control signal pulse width; and when operating in said auto-tune band and wherein said current total fuel adder comprises an auto-tune-entering adder that is incremented or decremented by an auto-tune band adder, said method further comprising:

(1.) calculating a preceding value correlated to the rate of change of acceleration, wherein said preceding value correlated to the rate of change of acceleration is calculated using the equation $\{\Delta(\Delta[period]/\Delta T)\Delta T\}$;

(2.) calculating a current value correlated to the rate of change of acceleration, wherein said current value correlated to the rate of change of acceleration is calculated using the equation $\{\Delta(\Delta[period]/\Delta T)\Delta T\}$;

(3.) comparing said preceding value correlated to the rate of change of acceleration to said current value correlated to the rate of change of acceleration to generate a comparison result; and (4.) incrementing or decrementing said auto-tune-entering adder by said auto-tune fuel adder based on said comparison result.

12. The method to provide a control signal to a fuel injector, as recited in claim 11, wherein:

said operational mode settings comprise a minimum cruise rpm threshold value, a cruise pulse-width threshold value, an acceleration pulse-width transition threshold value, an auto-tune pulse-width transition threshold value, and an auto-tune rpm threshold value;

said cruise band is selected based on at least said minimum cruise rpm threshold value and said cruise pulse-width threshold value;

said acceleration band is selected based on said acceleration pulse-width transition threshold value; and said auto-tune band is selected based on said auto-tune pulse-width transition threshold value and said auto-tune rpm threshold value.

13. The method to provide a control signal to a fuel injector, as recited in claim 11, further comprising:

when operating in said cruise band and wherein said total fuel adder comprises only said cruise band fuel adder, maintaining operation in said cruise band until one of the following occur:

(1.) if said ECU control signal pulse width becomes greater than said acceleration pulse-width transition threshold value, changing selection to said acceleration band;

(2.) if said ECU control signal pulse width becomes less than said cruise pulse-width threshold value and said value correlated to said current rpm becomes less than said minimum cruise rpm threshold value, changing selection to said pass-through band;

(3.) if said ECU control signal becomes greater than said auto-tune pulse-width transition threshold value and said value correlated to said current rpm is greater than said auto-tune rpm threshold, changing selection to said auto-tune band;

when operating in acceleration band and wherein said total fuel adder comprises only said cruise band fuel adder plus an acceleration band adder, maintaining operation in said acceleration band until one of the following occur:

(1.) if said ECU control signal pulse width remains greater than said acceleration pulse-width transition threshold value for more than said acceleration threshold number of injection cycles, changing selection to said cruise band;

(2.) if said ECU control signal pulse width becomes less than said cruise pulse-width threshold value and said value correlated to said current rpm becomes less than said minimum cruise rpm threshold value, changing selection to said pass-through band;

(3.) if said ECU control signal becomes greater than said auto-tune pulse-width transition threshold value and said value correlated to said current rpm is greater than said auto-tune rpm threshold, changing selection to said auto-tune band;

when operating in said auto-tune band and wherein said total fuel adder comprises at least a cruise band fuel adder plus an auto-tune band adder, said method further comprising:

maintaining operation in said auto-tune band until said ECU auto-tune band control signal becomes less than said auto-tune pulse-width transition threshold value or said value correlated to said current rpm becomes less than said auto-tune rpm threshold, and then reverting to said selected operational band in which said system was operating before entering said auto-tune band.

14. The method to provide a control signal to a fuel injector, as recited in claim 11, wherein said ECU pulses comprise an n ECU pulse, an n−1 ECU pulse, an n−2 ECU pulse, an n−1 ECU pulse, and an n ECU pulse, said method further comprising:

receiving said n−4 ECU pulse including an n−4 ECU control signal pulse width and an n−4 leading edge from said ECU;

receiving said n−3 ECU pulse including an n−3 ECU control signal pulse width and an n−3 leading edge from said ECU;

receiving said n−2 ECU pulse including an n−2 ECU control signal pulse width and an n−2 leading edge from said ECU;

receiving said n−1 ECU pulse including an n−1 ECU control signal pulse width and an n−1 leading edge from said ECU;

receiving said n ECU pulse including an n ECU control signal pulse width and an n leading edge from said ECU;

calculating the difference $\Delta T_{n-3}$ between said leading edge n−4 and said leading edge n−3;

calculating the difference $\Delta T_{n-2}$ between said leading edge n−3 and said leading edge n−2;

calculating the difference $\Delta T_{n-1}$ between said leading edge n−3 and said leading edge n−2;

calculating the difference $\Delta T_n$ between said leading edge n−1 and said leading edge n;

calculating r1 using the equation $r1 = \Delta T_{n-3} - 2(\Delta T_{n-2}) + \Delta T_{n-1}$;

calculating r2 using the equation $r2 = \Delta T_{n-2} - 2(\Delta T_{n-1}) + \Delta T_n$;

using a determination matrix to increment or decrement said auto-tune-entering adder by said auto-tune step value.

15. The method to provide a control signal to a fuel injector, as recited in claim 14, wherein said pulse width determination matrix comprises:
  (a.) if r1>r2 and if the preceding said auto-tune-entering adder was incremented by said auto-tune step value, then increment said auto-tune-entering total fuel adder by said auto-tune step value;
  (b.) if r1>r2 and if the preceding said auto-tune-entering adder was decremented by said auto-tune step value, then decrement said auto-tune-entering total fuel adder by said auto-tune step value;
  (c.) if r1<r2 and if the preceding said auto-tune-entering adder was incremented by said auto-tune step value, then decrement said auto-tune-entering total fuel adder by said auto-tune step value;
  (d.) if r1<r2 and if the preceding said auto-tune-entering adder was decremented by said auto-tune step value, then increment said auto-tune-entering total fuel adder by said auto-tune step value;
  (e.) if r1=r2 and if the preceding said auto-tune-entering adder was decremented by said auto-tune step value, then increment said auto-tune-entering total fuel adder by said auto-tune step value; and
  (f.) if r1=r2 and if the preceding said auto-tune-entering adder was incremented by said auto-tune step value, then decrement said auto-tune-entering total fuel adder by said auto-tune step value.

16. The method to provide a control signal to a fuel injector, as recited in claim 11, wherein said value correlated to the rate of change of acceleration comprises the rate of change of acceleration.

17. An add-on fuel injector control system comprising:
  a timing capture circuit receiving an electronic control unit (ECU) pulse comprising an ECU pulse width from an ECU and outputting an ECU pulse width value; and
  a controller configured to:
  receive said ECU pulse width value;
  determine an operational band from a plurality of operational bands based on a current revolutions per minute (rpm) of an engine's crankshaft and said ECU pulse width value, wherein said operational bands comprise a pass-through band and an auto-tune band;
  increase, when not in said pass-through band, said ECU pulse width value of a current one of said ECU pulses by adding a current total fuel adder to said ECU pulse width value;
  calculate, when in said auto-tune band, a value correlated to the rate of change of acceleration, wherein said value correlated to the rate of change of acceleration comprises the second derivative of a period {A(A[period]/AT)AT};
  determine, when in said auto-tune band, an auto-tune fuel adder; and
  output, when in said auto-tune band, an output pulse width based on said value correlated to the rate of change of acceleration and on whether, in a previous output pulse width, an auto-tune-entering adder was incremented or decremented by said auto-tune fuel adder.

18. The add-on fuel injector control system, as recited in claim 17, wherein:
  said plurality of operational bands further comprise a cruise band and an acceleration band;
  maintaining, unmodified, said amount of fuel delivered by said fuel injector to an internal combustion engine by passing a current one of said ECU pulses to said fuel injector unmodified, if said selected operational band is determined to be said pass-through band; and
  modifying said amount of fuel by increasing said ECU control signal pulse width value of said current one of said ECU pulses by adding a total fuel adder to said ECU control signal pulse width value, if said operational band is determined to be one of said cruise band, said acceleration band or said auto-tune band.

19. The add-on fuel injector control system, as recited in claim 17, further comprising:
  a microprocessor comprising an analog to digital converter (ADC) and a pulse width modulator (PWM); wherein said ADC samples an oxygen signal from an oxygen sensor; and wherein said PWM supplies a modified output pulse to said ECU.

* * * * *